United States Patent

Kuga et al.

[11] 4,230,654
[45] Oct. 28, 1980

[54] METHOD OF CONCURRENTLY-BIAXIALLY DRAWING POLYVINYL ALCOHOL FILM

[75] Inventors: Mutsuo Kuga, Kyoto; Kiyoshi Kitagawa, Hirakata; Motoo Kawasaki; Junkichi Watanabe, both of Kyoto, all of Japan

[73] Assignee: Unitika Limited, Amagasaki, Japan

[21] Appl. No.: 8,106

[22] Filed: Jan. 31, 1979

[30] Foreign Application Priority Data

Feb. 21, 1978 [JP] Japan .................................. 53/19306

[51] Int. Cl.² ........................ B29C 17/02; B29D 7/02
[52] U.S. Cl. .................................... 264/134; 264/129; 264/209; 264/210.3; 264/216; 264/235.8
[58] Field of Search .................... 264/134, 129, 210 R, 264/216, 289, 564, 567, 288, 209, 210.3, 235.8, 171, 173

[56] References Cited

U.S. PATENT DOCUMENTS

| | | |
|---|---|---|
| 3,136,657 | 6/1964 | Dixler . |
| 3,214,291 | 10/1965 | Dixler . |
| 3,440,316 | 4/1969 | Miyake et al. ...................... 264/288 |
| 3,985,849 | 10/1976 | Notomi et al. ...................... 264/567 |
| 4,124,677 | 11/1978 | Saijo et al. ........................ 264/185 |

FOREIGN PATENT DOCUMENTS

| | | | |
|---|---|---|---|
| 1202974 | 10/1965 | Fed. Rep. of Germany ........ 264/289.9 |
| 2455504 | 5/1975 | Fed. Rep. of Germany ........... 264/564 |
| 38-23336 | 11/1963 | Japan ..................................... 264/185 |
| 51-28169 | 3/1976 | Japan ................................. 264/289.9 |
| 51-50370 | 5/1976 | Japan ..................................... 264/185 |
| 51-61569 | 5/1976 | Japan ..................................... 264/129 |
| 52-26787 | 7/1977 | Japan ..................................... 264/216 |

Primary Examiner—James B. Lowe
Attorney, Agent, or Firm—Oblon, Fisher, Spivak, McClelland & Maier

[57] ABSTRACT

A concurrent-biaxially drawn polyvinyl alcohol film is prepared by fabricating a molten hydrate polyvinyl alcohol into a film; drying it under preventing an orientation thereof to form a substantially non-orientated substrate film having a water content of 3 to 20 wt. %; coating an aqueous dispersion of a macromolecular compound on at least one surface of the substrate film to form a coated film having an average water content of 5 to 30 wt. % with an increased water content of 2 to 10 wt. %; concurrent-biaxially drawing the coated film at an area elongation percent of 600 to 1300% to form a drawn film; drying the drawn film under releasing stress at a water content of less than 3 wt. % to form a dried film; and heat-treating continuously the dried film at higher than 160° C. and lower than a decomposition temperature for a short time.

17 Claims, 1 Drawing Figure

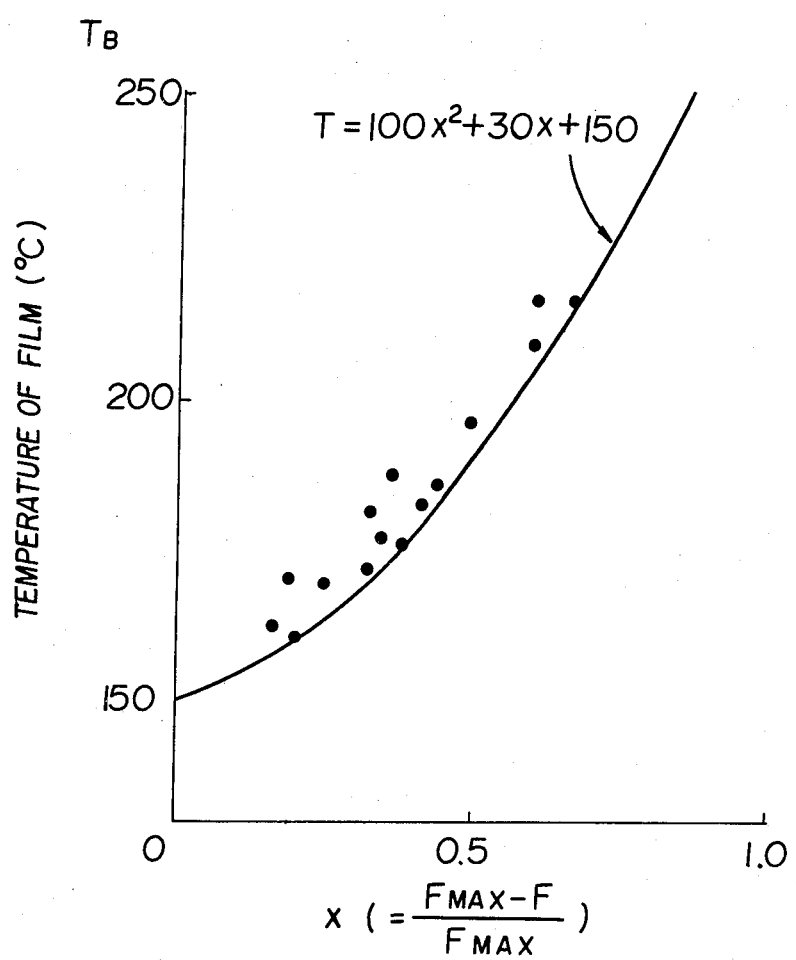

METHOD OF CONCURRENTLY-BIAXIALLY DRAWING POLYVINYL ALCOHOL FILM

BACKGROUND OF THE INVENTION

1. Field of the Invention

The present invention relates to a process for preparing a biaxially drawn polyvinyl alcohol film coated with a macromolecular compound other than polyvinyl alcohol on at least one surface of the film. More particularly, it relates to a process for preparing a biaxially drawn polyvinyl alcohol film having high tensile strength and Young's modulus which has a coated layer of a macromolecular compound having a special function such as heat resistance, heat-sealable function and water resistance on its surface depending upon a usage which is prepared by coating an aqueous dispersion of a macromolecular compound such as homopolymers, copolymers, terpolymers, derivatives and modifiers thereof on at least one surface of a non-orientated substrate polyvinyl alcohol film and then, concurrent-biaxially drawing the film at high elongation percent and drying while releasing stress and heat-treating it.

2. Description of the Prior Arts

Various processes for uniaxially or biaxially drawing a film and heat-treating it to improve tensile strength and water resistance of a polyvinyl alcohol film have been proposed, for example, U.S. Pat. No. 3,440,316 discloses a process for preparing a film by drawing a polyvinyl alcohol film having a water content of less than 5 wt.% at a temperature higher than 120° C. at an area elongation percent of 200% to 1000% and then, heat-treating at 140° C. to 250° C. For example, a film having a tensile strength of 13.6 Kg/mm$^2$ and an elongation of 93% is prepared by a biaxial drawing at an area elongation percent of 650%.

However, the biaxially drawn polyvinyl alcohol films obtained by the conventional processes have relatively low tensile strength such as lower than 14 Kg/mm$^2$ and various troubles have been found in applications of the films in food packaging field requiring high tensile strength.

The inventors have been studied a process for biaxially drawing a polyvinyl alcohol film in high elongation percent and have found that it is necessary to prepare a substantially amorphous non-drawn polyvinyl alcohol film while preventing orientation caused by excess tension or sudden drying during fabrication and drying of a polyvinyl alcohol substrate film. It is necessary to prepare a drawn film which is durable to heat-treatment of high degree by drying the film while releasing stress before heat-treatment after the drawing. It is further necessary to control the water content in the film in these steps, and it is necessary to impart certain characteristics to the drawn polyvinyl alcohol film such as water resistance, heat-resistance and heat sealable properties, depending upon the usage, by coating an aqueous dispersion of a macromolecular compound other than polyvinyl alcohol on at least one surface of the substrate film and concurrently biaxially drawing the coated film. It is necessary to select the concentration and pH of the aqueous dispersion of the macromolecular compound so that water in the aqueous dispersion on the surface of the substrate film diffuses and permeates into the substrate film and to modify the water content distribution in the film which normally is a high water content in the central portion of the film to a low water content in the surface layer of the film which is not a preferable distribution for drawing and which is caused by the drying of the substrate film. The present modifications highly effective for improving the drawing of the substrate film.

The inventors have found that a biaxially drawn polyvinyl alcohol film having a coated layer having useful function having high value on its surface which has a tensile strength of more than 25 Kg/mm$^2$ especially more than 30 Kg/mm$^2$ in optimum condition can be obtained by the combination of these steps.

SUMMARY OF THE INVENTION

It is an object of the present invention to provide a process for preparing a biaxially drawn polyvinyl alcohol film which has high tensile strength and a special function such as water resistance, heat resistance or heat-sealable function.

The foregoing and other object of the present invention have been attained by preparing a concurrent-biaxially drawn polyvinyl alcohol by fabricating a molten hydrate polyvinyl alcohol into a film; drying it while preventing orientation of the film to form a substantially non-orientated substrate film having a water content of 3 to 20 wt.%; coating an aqueous dispersion of a macromolecular compound on at least one surface of the substrate film to form a coated film having an average water content of 5 to 30 wt.%, the water content of the substrate film thereby having an increased water content of 2 to 10 wt.%; concurrently-biaxially drawing the coated film to an area elongation percent of 600 to 1300% thereby forming a drawn film; drying the drawn film while releasing stress to achieve a water content of less than 3 wt.% and heat-treating continuously the dried film at a temperature higher than 160° C. but lower than the decomposition temperature.

DETAILED DESCRIPTION OF PREFERRED EMBODIMENTS

The polyvinyl alcohol used for the process of the present invention is preferably a polyvinyl alcohol having a polymerization degree of 700 to 2100 and a hydrolysis degree of more than 98 mole %, especially 99 mole % and can be a composition of the polyvinyl alcohol with a desired additive such as plasticizer and lubricant, or a modified polyvinyl alcohol having the fundamental characteristics of polyvinyl alcohol.

In the first step of fabrication and drying of the polyvinyl alcohol substrate film, a film is prepared by a flow-casting method using an aqueous solution of less than 20 wt.% polyvinyl alcohol or by a hydrate extrusion method using a melt-extruding hydrate having a concentration of 40 to 60 wt.% polyvinyl alcohol.

In the flow-casting method, there is the advantage that the film is not substantially oriented during fabrication and the drying step, however, there is a disadvantage of slow drying speed, because of low concentration of polyvinyl alcohol. In order to improve the drying speed, and to attain mass production at high speed, the hydrate extrusion method is preferable.

In the latter method, it is necessary to dry the film while preventing drawing of the film in the longitudinal direction after extruding the molten polyvinyl alcohol through a slit and achieving a gelation.

In the fabrication of the film by a T-die method, it is preferable to employ a method in which the molten polyvinyl alcohol extruded through the T-die is taken up on a quenching roll to achieve gelation and then the film is dried thereby achieving a water content of 3 to 20 wt.%, preferably 5 to 10 wt.% while maintaining the film in a substantially non-oriented state by preventing orientation of the film during drying by certain manipulation such as maintaining or gradually decreasing the speed of the film on a heating roll, multi-stage belts or in an oven for a tenter in comparison with the speed of the first quenching roll.

When, the film is fabricated by the tubular method, it is necessary to dry the film under conditions in which the longitudinal elongation percent and a transversal elongation percent are minimized and approached wherein the former is given by the ratio of speed of extruding the molten polyvinyl alcohol from a ring strip to the speed for running the tubular film in the drying step and the latter is given by the ratio of the diameter of a slit to a diameter of the tubular film in the drying step.

The degree of the orientation of the dried substrate film can be studied by X ray diffraction or double refraction. However, it is easily determined by sampling a long rectangular test piece in the transversal direction and in the longitudinal direction from the substrate film and then stretching the test pieces with a tension tester. In this test, when the difference in elongation behavior between the transverse direction and the longitudinal direction is small and the stress during stretching is lower, then it is an amorphous film. When the stress in the longitudinal direction is higher than that in the transverse direction, the film is oriented in the longitudinal direction in the drying step and it is not suitable as a substrate film for the concurrent-biaxially drawn film in high elongation percent and the others.

In particular, a ratio of a tensile strength in the transversal direction to that of the longitudinal direction, at an elongation of 100% (2 times) is in a range of 0.6 to 1.6 preferably 0.7 to 1.4 in a tension test at 100° C., and the substrate film is suitable as the film for use in the first step of the present invention.

The reason will be illustrated by experimental results shown in Table 1.

In these tests, polyvinyl alcohol substrate films prepared by fabricating and drying under various conditions area at suitable conditions tested by a tenter type concurrent biaxial drawing device set to give elongation ratios of 3.3 times in both the longitudinal direction and the transverse direction to evaluate drawing functions of the films and test pieces in a long rectangular shape in the longitudinal direction and in the transverse direction are sampled from the non-drawn films and the samples are uniaxially drawn at 100° C. by a tension tester and tensile strengths at an elongation of 100% are measured. The results are shown in Table 1.

TABLE 1

| Thickness of film (μ) | Water content of film (%) | Tensile strength at elongation of 100% (uniaxial drawing test) (Kg/cm$^2$) | | | Result of biaxially drawing test |
|---|---|---|---|---|---|
| | | Long | Trans. | Ratio of L/T. | |
| 1 | 120 | 8.6 | 104 | 77 | 1.35 | O |
| 2 | 120 | 5.5 | 135 | 89 | 1.52 | Δ |
| 3 | 135 | 11.3 | 112 | 91 | 1.23 | O |
| 4 | 125 | 7.3 | 139 | 113 | 1.23 | O |
| 5 | 165 | 17.0 | 128 | 65 | 1.97 | X |
| 6 | 150 | 10.2 | 127 | 124 | 1.02 | O |
| 7 | 145 | 9.7 | 138 | 94 | 1.47 | Δ |
| 8 | 140 | 8.0 | 135 | 81 | 1.67 | X |
| 9 | 175 | 15.6 | 89 | 64 | 1.39 | O |

TABLE 1-continued

| Thickness of film (μ) | Water content of film (%) | Tensile strength at elongation of 100% (uniaxial drawing test) (Kg/cm$^2$) | | | Result of biaxially drawing test |
|---|---|---|---|---|---|
| | | Long | Trans. | Ratio of L/T. | |
| 10 | 165 | 14.8 | 98 | 57 | 1.72 | X |
| 11 | 120 | 14.1 | 67 | 80 | 0.84 | O |
| 12 | 120 | 14.2 | 60 | 84 | 0.71 | O |
| 13 | 120 | 13.8 | 60 | 93 | 0.65 | Δ |
| 14 | 120 | 13.1 | 64 | 112 | 0.57 | X |

Note:
Long. = longitudinal direction
Trans. = transversal direction
Ratio of L/T = ratio of tensile strength in longitudinal direction to that of transversal direction.
O : excellent drawability
Δ : narrow drawable range
X : difficult drawability In the second step of the process of the present invention, an aqueous dispersion of a macromolecular compound such as a homopolymer, copolymer, terpolymer, derivative or modifier is coated on at least one surface of the dried substrate film.

As to the method of coating a dispersion or solution of a macromolecular compound on a polyvinyl alcohol film, it has been proposed to provide polyvinyl alcohol films coated on at least one surface with a polymer composition comprising about 90 to 95 wt.% of a copolymer produced from 50 to 75 wt.% vinylidene chloride and 50 to 25 wt.% vinyl chloride and about 5 to 10% of a terpolymer produced from 75 to 94.5% vinyl chloride, 24.5 to 5% vinyl acetate and 5 to 0.5% of one of ethylenically unsaturated aliphetic carboxylic acid or anhydride thereof as shown in Japanese Patent Publication No. 17443/1964 and U.S. Pat. No. 3,136,657. This method relates to a coating for protecting a film of polyvinyl alcohol from moisture and to maintain excellent oxygen gas blocking function of polyvinyl alcohol barrier by forming a water-proofing membrane on the surface of the polyvinyl alcohol film so as to improve this characteristic of the film.

In the process of the present invention, an aqueous dispersion of a macromolecular compound is coated on the substrate film dried to a certain water content whereby water the aqueous dispersion on the film surface permeates into the surface layer of the substrate film thereby increasing the average water content of the film by 2 to 10 wt.% so as to give an average water content of 5 to 30 wt.%. Accordingly, the water content distribution in the thickness direction of the substrate film is improved so that it is suitable for drawing and the concurrent biaxial drawing in high elongation ratio can be easily attained advantageously.

In the drying step of a polyvinyl alcohol film, when the water content is less than 40 wt.%, the drying speed is substantially similar to the diffusion speed whereby the water content distribution is formed in the thickness direction of the film, and water in the inner part of the film diffuses to the surface layer at a speed proportional to the water content gradient. Accordingly, the film dried to the required average water content has less than the required water content in the surface layer and higher than the required water content in the inner part just after drying.

In the drawing step of the polyvinyl alcohol film, the water in the film has the function of a plasticizer which highly affects the drawability of the film thus control of the water content is very important in the drawing of the film.

In the film, just after drying which has high water content in the inner part and low water content in the surface layer, the optimum drawing condition is different in the thickness direction which promotes inferior drawability. For example, when the film is drawn at a drawing temperature suitable for the water content in the surface layer, the temperature is too high in the inner part having high water content whereby bubbling or melt-breaking results. On the contrary, when it is drawn at a drawing temperature suitable for the inner part having a high water content, a local excess stress is applied at the surface layer having low water content whereby translucence or a breaking of the film is caused.

Thus, it is quite effective for the effective concurrent-biaxial drawing at high elongation ratio to control the difference of the water contents in the thickness direction caused in the drying step by coating an aqueous dispersion of a macromolecular compound on the surface of the film to move water of the dispersion into the surface layer of the film in the second step.

When the water content increase is less than 2 wt.%, the control of the water content distribution is insufficient whereas when it is more than 10 wt.%, water adsorption is too much and the water content distribution is reversed so that a higher water content is achieved in the surface layer of the substrate film and the average water content is too high. Therefore it takes a long time to dry the film after the drawing, disadvantageously. The water content increase is preferably in a range of 2 to 10 wt.%.

The aqueous dispersion of the macromolecular compound used in the process of the present invention should be coated on the surface of the dried polyvinyl alcohol substrate film having a water content of 3 to 20 wt.% to increase the average water content of the same by 2 to 10 wt.% so as to give an average content of 5 to 30 wt.%.

The effect of the present invention is especially improved in the following conditions.

The main feature of the present invention is to coat a macromolecular compound other than polyvinyl alcohol on the substrate film before the drawing step and then, to carry out the concurrent biaxial drawing step, whereby the coated layer is also drawn. For example, when the elongation ratio is a factor of 10 times i.e. an area elongation percent of 900%, the thickness of the coated layer is reduced by 1/10.

Some macromolecular compound coated should require certain thickness for imparting a function of the marcromolecular compound. According to the inventors' experiences, there are many cases imparting desired effect by coating a macromolecular compound at a solid component rate of more than about 1 g/m$^2$ on each surface as a final film that is, more than 10 g/m$^2$ on each surface of the substrate film before the drawing.

When the aqueous dispersion is coated on each surface of the polyvinyl alcohol substrate film having a water content of 3 to 20 wt.%, at a solid component rate of more than 10 g/m$^2$, excellent coating having uniform thickness can be performed in high proccessability by selecting the aqueous dispersion of a macromolecular compound from the following ranges.

A solid concentration of the aqueous dispersion of a macromolecular compound is preferably in a range of 20 to 60 wt.%. When the solid concentration is less than 20 wt.%, the water content is too high. When more than 10 g/m$^2$ of the solid component rate is coated on each surface, it is not easy to form the coated membrane after the coating to decrease the processability. Moreover, the amount of water absorbed by the substrate film is too much, disadvantageously. When the solid concentration is higher than 60 wt.%, the stability of the dispersion is not high enough to prevent gelation and the uniformity of the thickness of the coated layer is not satisfactory.

It is preferable to use an aqueous dispersion having a pH of 2 to 9 since the pH of the aqueous dispersion greatly affects the characteristics of the film.

When the pH is too high, the particles of the macromolecular compound in the aqueous dispersion contains a large water content water which causes inferior stability of the aqueous dispersion and inferior fabricability of the coated membrane. Moreover the water absorption of the substrate film is too much and a thick coating to give a solid component rate of more than 10 g/m$^2$ is difficult. Accordingly, the pH is preferably lower. However, when the pH is less than 2, deterioration and decomposition of the macromolecular compound is caused in strongly acidic solution.

As described above, in the process of the present invention, it is especially effective to coat the aqueous dispersion of a macromolecular compound having a solid concentration of 20 to 60 wt.% and pH of 2 to 9 at a solid component rate of more than 10 g/m$^2$ on each surface of the polyvinyl alcohol substrate film.

Suitable macromolecular compounds include such homopolymers as polyethylene, polystyrene, polyvinyl, polyacryl and polyurethane type polymers; fluorinated resins; silicone resins; epoxy resins and natural resins; copolymers such as vinylidene chloride/vinyl chloride copolymers, vinylidene chloride/acryl copolymers, vinyl acetate/acryl copolymers, styrene/acryl copolymers, and ethylene/vinyl acetate copolymers; terpolymers such as methyl methacrylate/ethyl acrylate/acrylic acid terpolymers, ethylene/vinyl acetate/Veova terpolymers (Veova is a tradename for the vinyl ester of a $C_{10}$ synthetic aliphatic acid of the formula: $R_2R_3R_3CCO_2CH=CH_2$.); derivatives such as nitrocellulose; and modifiers such as synthetic rubber modified resins, vinyl acetate modified resins and acryl modified resins and mixtures thereof.

The type of macromolecular compound selected depends upon the projected use of the product wherein a surface membrane layer is formed having the desired function and to increase the value of the film.

In order to improve water resistance which is one disadvantage of polyvinyl alcohol films, an aqueous dispersion of polyethylene or vinylidene chloride type polymer is coated on the substrate film to obtain films having high water resistance. Such films also have excellent oxygen gas barrier properties as polyvinyl alcohol films and high tensile strength which is synergistically derived from the biaxial drawing at high elongation ratios. Such films are good for food packaging.

When the aqeuous dispersion of a heat resistant macromolecular compound such as acrylate copolymers, styrene-acryl copolymers, urethane copolymers, fluorinated resins and silicone resins is coated, the heat resistance of the surface of the resulting film is highly improved which improves the processability of the film in a bag making machine and an automatic packaging machine.

When the aqueous dispersion of a heat sealable macromolecular compound such as polyethylene, ethylene-vinyl acetate copolymers, nitrocellulose, and vinyl acetate polymers is coated, the biaxially drawn film itself has a low temperature heat sealable property and it can be used for making bags without a polyethylene laminate or a part coat and it can be used for a light duty packaging such as overlap packaging.

In the third step of the present process, the polyvinyl alcohol film having the coated layer of the macromolecular compound is concurrently-biaxially drawn to the extent that an area elongation percent of 600% to 1300% is achieved. It is preferable to slightly dry the coated layer thereby forming a membrane which renders the film easy to treat to improve processability of the film when transferred during processing by groups of rolls, and by a pair of nip rolls which controls the speed of the film and when the film is fed into a drawing device.

The area elongation percent means the percent of increased area caused by drawing of the original area of the film.

When the original area A before the drawing is changed to the area B by the drawing, the increased area is $B-A$ and the area elongation is $(B-A)/A$. By a factor of example, when a film is drawn for 3 times in the longitudinal direction and in the transverse direction, the area elongation percent is 800%. When the area elongation percent is less than 600%, orientation of the film by the drawing is not high enough to obtain a film having a tensile strength greater than 25 Kg/mm$^2$, whereas when it is more than 1300%, the drawing is too much and the tensile strength is decreased.

The concurrent biaxial drawing can be carried out by a tenter method or a tubular method.

The tenter concurrent biaxial drawing method is performed by holding the edges of a film with clips provided on two pairs of endless link chain devices of a special tenter type drawing device and then elongating the distances between the link chain devices depending upon forwarding the link devices to draw in the transverse direction and simultaneously, elongating the pitch between the clips depending upon forwarding the link chain devices to draw the film in the longitudinal direction.

Various methods have been employed for the tubular concurrent biaxial drawing method. The typical method is performed by passing a tubular film containing a higher pressure gas inside of the film between two pairs of nip rolls which have different speeds to draw the tubular film in the transverse direction by the elongation caused by the inner gas pressure and to draw the tubular film in the longitudinal direction by the speed difference of the two pairs of nip rolls.

In the concurrent biaxial drawing, the ratio of the elongation ratio in the transverse direction to that of the longitudinal direction should be in a range of 0.5 to 2.0 during all drawing steps from the starting to the end of the drawing.

The inventors have found that concurrent biaxial drawing is the optimum technique to obtain a highly biaxially oriented polyvinyl alcohol film and the water content and water content distribution in the thickness direction of the polyvinyl alcohol film substantially affects the drawability, mechanical and optical properties of the drawn film.

The typical biaxial drawing method is a two step biaxial drawing method wherein a film is drawn in the longitudinal direction by a longitudinal drawing device having group of rolls and then, both edges of the film are held and drawn in the transverse direction by a tenter. In biaxial drawing of polyvinyl alcohol, crystallization of polyvinyl alcohol is high which causes serious orientation by the first longitudinal drawing and to give high tensile strength in the longitudinal direction, however bonding strength in the transversal direction is too weak and the film is fibrilated in the form of a reed screen and the transverse drawing is difficult.

The trouble can be prevented by the concurrent biaxial drawing method. Thus, in order to give an area elongation percent of more than 600% which is required in the process of the present invention, the water content of the film in the drawing step should be carefully controlled. When the water content is more than 30%, the film is deformed only under fluid behavior and a satisfactory orientation is not given, whereas when it is less than 5%, the plasticizing effect for the drawing is not satisfactory which results in increase stress in the drawing near the tensile strength of the film and the film is often treated from a small defect and a stable drawing operation can not be performed.

The water content distribution in the thickness direction highly affects to a drawability and physical properties of the drawn film.

When the water content distribution in the thickness direction is controlled by coating the aqueous dispersion of a macromolecular compound such as waxes, vinylidene chloride polymers, polyethylene, ethylene-vinyl acetate copolymers, nitrocellulose, vinyl acetate polymers, acrylate polymers, styrene-acryl copolymers, urethane polymers, fluorinated resins and silicone resins, the drawability and physical properties such as transparency of the drawn film are superior to those of the drawn film obtained from the untreated film having non-uniform parabola water content distribution of lower water content in the surface layer and higher water content in the inner part just after drying.

It is preferable to coat the aqueous dispersion of a macromolecular compound on both of the surfaces of the substrate film to absorb water from both surfaces, however a satisfactory effect may be given sometimes by water absorption from one surface of the substrate film.

In the fourth step of the process of the present invention, the film is dried to a water content of less than 3 wt.% while releasing the stress of the film. This step is important for the following heat-treating step. If the stess release is not satisfactory or the water content in the dried film is more than 3 wt.%, then the tensile strength and the melting point of the film are too low to carry out the heat-treatment at high temperature.

Stress remains in the drawn film in the longitudinal direction and in the transverse direction by the concurrent-biaxial drawing, and the stress reaches a maximum at the end of the drawing step (maximum elongation ratio). In the case of most thermoplastic resin films, stress can be released by heating the film as a heat-treatment at the end of the drawing step and accordingly, a heat-treating zone is directly connected to a drawing zone.

In the case of drawing of a polyvinyl alcohol film, the maximum stress remains at the end of the drawing step. The film treated by the steps of the process of the present invention contains relatively large amount of water and accordingly, it is not suitable to carry out a heat-treatment at high temperature without reducing the water content. When a polyvinyl alcohol film is dried, volumetric contraction results. If the film is heated while maintaining the size after the drawing step, the contraction is caused by the drying and stress release is prevented. A polyvinyl alcohol film having a high water content has a relatively low tensile strength and low melting point before performing high crystallization by a heat-treatment even though the drawing of the film is finished. This tendency appears substantially at higher temperatures and higher water contents. Accordingly, if a polyvinyl alcohol film having high water content and remaining stress at the end of the drawing step is heat-treated at high temperature, the film is torn or melt-broken. In order to prevent such trouble, it is necessary to dry the film to a water content of less than 3 wt.% under a stress-releasing condition in a step of releasing stress and drying the film after the drawing step. The step can be carried out in a device separating from the drawing device or it can be continuously carried out in connection with the drawing step.

In the case of the tenter type method, it is possible to carry out the step by extending the link devices of the drawing device and maintaining the transversal distance and the longitudinal pitches of the link devices are kept in those of the end of the drawing step and performing gradually the stress release and the drying under a tension or it is also possible to carry out the step by releasing rapidly stress with a modified link shifting device for reducing slightly the distance and the pitches from them at the end of the drawing step.

When the step is carried out by a separate device independent to the drawing device, it is necessary to use a device controlling the distances in both of the transversal direction and the longitudinal direction. For example, a tenter type dryer or a vacuum belt type dryer is especially effective.

In the step, it is necessary to control a temperature of the film depending upon the water content and the remained stress of the film. When the water content is high and the remained stress is high, the temperature of the film should be lower.

Thus, the inventors have found by their experiments, that the maximum temperature of the film in the step can be given by the following equation of a stress release coefficient x regardless of a water content and a thickness of the film and a drawing speed in the case of a stress release under a tension $$x = \frac{F_{max} - F}{F_{max}}$$

$F_{max}$: maximum stress at the end of the drawing step
F: stress in the stress releasing step
x: stress release coefficient
$T \leq 100\ x^2 + 30\ x + 150$ (°C.)

The step of the stress release and the drying can be carried out at the film temperature of lower than the temperature T.

Certain experimental data for finding the above-mentioned equation are shown in Table 2.

Relations of maximum temperatures of films and stress release coefficients are studied by drawing a polyvinyl alcohol film prepared by fabricating, drying and coating in various conditions at an elongation ratio of 3.3 times in the longitudinal direction and at an elongation ratio of 3.32 times in the transversal direction to give an area elongation percent of 1,000% and drying by a tenter type concurrent biaxial drawing device and then, releasing stress of the film and drying the film in a stress releasing zone having a length of 4 m thourgh which tenter links are moved under maintaining the distances at the end of the drawing step and which is directly connected to the drawing zone.

The film stress is determined by equipping strain gauges with the link devices of the drawing devices and detecting longitudinal and transversal strains of the link device given by the film and a total strains are shown as the characteristic values.

Infrared ray type thermometers are respectively equipped at the inlet and positions of 1 m, 2 m and 3 m from the inlet of the stress releasing zone to detect always elevated temperature curve of the film and a heat source for heating the film in the stress-releasing zone is controlled to elevate the temperature of the film and a temperature at the tearing or the melt-break is given as the maximum film temperature.

In Table 2, estimate temperatures T* are given by the following equation from the maximum stress F max at the end of the drawing step (inlet of the stress releasing zone), the stress F of the film at the tearing or the melt-breaking and the maximum temperatures $T_B$ of the film at the tearing or the melt-breaking determined from the measured temperatures at said positions and the stress release coefficient x at the tearing or the melt-breaking.

$T^* = 100x^2 + 30x + 150$

TABLE 2

| Test No. | F max (Kg) | F (Kg) | F max-F (Kg) | x | $T_B$ (°C.) | T* (°C.) |
|---|---|---|---|---|---|---|
| 1 | 7.0 | 5.9 | 1.1 | 0.16 | 162 | 157.4 |
| 2 | 5.7 | 4.3 | 1.4 | 0.25 | 169 | 163.8 |
| 3 | 7.0 | 4.6 | 2.4 | 0.34 | 177 | 171.6 |
| 4 | 5.7 | 3.2 | 2.5 | 0.44 | 185 | 182.6 |
| 5 | 5.3 | 2.7 | 2.6 | 0.49 | 196 | 188.7 |
| 6 | 4.9 | 3.9 | 1.0 | 0.20 | 160 | 160.0 |
| 7 | 5.7 | 3.9 | 1.8 | 0.32 | 171 | 169.8 |
| 8 | 5.3 | 3.3 | 2.0 | 0.38 | 176 | 175.8 |
| 9 | 7.0 | 2.3 | 4.7 | 0.67 | 216 | 215.0 |
| 10 | 5.3 | 3.6 | 1.7 | 0.32 | 172 | 169.8 |
| 11 | 7.0 | 4.1 | 2.9 | 0.41 | 182 | 179.1 |
| 12 | 5.7 | 2.3 | 3.4 | 0.60 | 209 | 204.0 |
| 13 | 5.3 | 4.3 | 1.0 | 0.19 | 170 | 159.3 |
| 14 | 5.3 | 3.4 | 1.9 | 0.36 | 187 | 173.8 |
| 15 | 5.3 | 2.1 | 3.2 | 0.60 | 216 | 204.0 |

FIG. 1 shows plots of stress releasing coefficients x on abscissa and maximum temperatures of films $T_B$ on ordinate and a full line of a curve given by the equation of $T^* = 100x^2 + 30x + 150$ In FIG. 1, all of plots are above the full line T* and accordingly, it is clear that the stress releasing and drying step can be carried out in safety without tearing nor melt-breaking when the temperature of the film at the stress-releasing zone is kept at lower than T*.

In the stress-releasing and drying step, a water content of the film is maintained to less than 3 wt.%, to obtain a drawn film being durable to the heat-treatment at high temperature.

In the final step of the process of the present invention, the film dired to a water content of less than 3 wt.% after the drawing step, is heat-treated at a film temperature of 160° C. to a decomposition temperature for a short time, whereby the orientation of the drawn film is fixed and the crystallization is further increased to obtain a biaxially drawn polyvinyl alcohol film having excellent tensile strength, Young's modulus, water resistance and size stability.

The final step can be carried out by a heat-treating device comprising hot rolls which is separated from the drawing device in the third step and the stress-releasing and drying device in the fourth step.

In the tenter type method, the step can be also carried out under holding the film by the tenter device running on a rail from the drawing zone to the heat-treating zone.

When the heat-treatment is carried out by a separate heat-treating device, it is necessary to treat the film without winding up the film between the devices.

As described above, in accordance with the process of the present invention, the substantially amorphous substrate film suitable for the concurrent-biaxial drawing at high elongation ratio is obtained by preventing the orientation at the fabrication and drying of the polyvinyl alcohol film; the uniform water content of the substrate film is given to improve the drawability by absorbing water of the aqueous dispersion into the film by coating the aqueous dispersion of a macromolecular compound on the substrate film before the drawing step and to form a coated layer of the macromolecular compound having a special function on the polyvinyl alcohol substrate film; the concurrentbiaxial drawing at high elongation ratio is carried out; the drawn film is modified to be durable to the heat-treatment by drying the film under releasing stress after the drawing step; and the film is heat-treated at high temperature and said five steps are combined to utilize synergistic effects of the steps. As the results, it is possible to obtain a biaxially drawn polyvinyl alcohol film which has a coated layer having a desired function depending upon the usage and the purpose and has excellent tensile strength, Young's modulus and size stability and has not directional difference.

A thickness of the modified polyvinyl alcohol substrate film obtained by the process of the present invention is not critical and can be less than $5\mu$ or greater than $50\mu$ after the heat-treatment in the final step. This is one of advantages of the process of the present invention.

The water content of the film in the specification is determined by drying a substrate film or a coated film in a hot air oven at 105° C. until reaching to a weigh constant and it is shown as a percent of the reduced weight by the drying to the original weight before the drying.

The following non-limiting examples will serve to illustrate the present invention.

EXAMPLE 1

Polyvinyl alcohol having a polymerization degree of 1680 and a hydrolysis degree of 99.95 mole % were dried to have a water content of 53 wt.% in a form of a flaky material. The polyvinyl alcohol was melted by an extruder having a diameter of 115 mm and extruded through a T die on a quenching roll driven at a peripheral speed of 15 m/min. to prepare a gelated film. The film was dried in a multi-step belt type hot air oven which was driven at the speed of the quenching roll. A latex of vinylidene chloride having a solid concentration of 45 wt.% and pH of 4 was coated on both surfaces of the film at a solid component rate of 15 g/m² for each surface by an impregating coater disposed at the outlet of the oven. The coated film was passed through a drying zone having a length of 5 m to form a coated membrane on the surface of the film.

The substrate film at the outlet of the oven had a water content of 8.3 wt.%.

In a test of a uniaxial drawing of the test piece at 100° C., a ratio of a tensile stress in the longitudinal direction to that of the transversal direction was 1.10 at an elongation percent of 100%.

An average water content of the coated film dried after the coating to form the coated membrane was 12.8 wt.% and the increased water content to the dried substrate film was 4.5 wt.%.

A concurrent biaxial drawing step, a stress-releasing and drying step and a heat-treating step were continuously carried out by feeding the film to a drawing device comprising a drawing zone having a length of 1.2 m set at a transversal elongation ratio of 3.5 times and a longitudinal elongation ratio of 3.3 times; a stress-releasing zone having a length of 4 m through which tenter clips were run under maintaining the elongation ratios at the end of the drawing step; and a heat-treating zone having a length of 4 m. The environmental temperatures were kept at 100° C. in the drawing zone, at 150° C. in the stress-releasing zone and at 240° C. in the heat-treating zone and the concurrent biaxial drawing, the stress-releasing and the drying and the heat-treating were continuously performed.

Infrared ray type thermometers were respectively equipped at the end of the drawing step, the outlet of the stress-releasing zone and the outlet of the heat-treating zone to measure the temperatures of the film. A strain gauge was equipped with the tenter device and the stress applied to the film was measured from the sum of the forces applied to the tenter clips. Moreover, average water contents were measured after sampling to film at various positions. The results are shown in Table 3.

TABLE 3

| Position | Temperature of film (°C.) | Stress (Kg) | Water content (%) |
|---|---|---|---|
| End of drawing zone | 80 | 7.0 | 5.9 |
| Outlet of stress releasing zone | 135 | 2.4 | 1.2 |
| Outlet of heat-treating zone | 225 | less than 1 | 0.2 |

The resulting film had high tensile strength and Young's modulus and had excellent oxy gas barrier property. Even though the film was boiled in a boiled water for 10 minutes, it was not dissolved and had excellent mechanical property, water resistance and gas barrier preparty whereby it is ideal as a film for food packaging.

EXAMPLE 2

A flaky composition prepared by mixing 100 wt. parts of polyvinyl alcohol having a polymerization degree of 1680, a hydrolysis degree of 99.4 mole%, 90 wt. parts of water and 7 wt. parts of glycerin was melted by an extruder having a diameter of 65 mm and extruded through a T-die on a quenching roll driven at a peripheral speed of 6 m/min. to prepare a gelated film. The film was dried to a water content of 10 wt.% in a hot roll type dryer comprising four polytetrafluoroethylene coated rolls driven at the same speed and eight chromium plated rolls driven at gradually reduced speed. The film speed at the outlet of the dryer was 5.2 m/min.

In a test of an uniaxial drawing of test pieces having a size of 1 cm × 15 cm in the longitudinal direction and in the transversal direction at 100° C., a ratio of a tensile stress in the longitudinal direction to that of the transversal direction was 1.03 at an elongation percent of 100%. A latex of styrene-acryl copolymer having a solid concentration of 40 wt.% and pH of 5 was coated on one surface of the dried film at a solid component rate of 8 g/m$^2$ by a reverse roll type coater and the coated film was passed through an air drying zone having a length of 7 m to form a coated membrane on the surface. The water content was 13.5 wt.%.

The coated film was fed into a concurrent-biaxially drawing device comprising a drawing zone having a length of 1 m set at a transversal elongation ratio of 2.8 times and a longitudinal elongation ratio of 3.3 times; and a stress-releasing zone having a length of 3 m through which tenter clips were run under maintaining the elongation ratios at the end of the drawing step. In the drawing zone, hot air at 110° C. was fed on both surfaces of the film, the drawing was smoothly performed to give 105° C. of a temperature of the film and 4.5 wt.% of a water content at the end of the drawing step.

A hot air at 160° C. was fed in the stress-releasing zone to give 150° C. of a temperature of the film and 0.9 wt.% of a water content at the outlet of the step and the sum of the forces applied to the tenter clips was reduced for 10% from the maximum sum of the forces at the end of the drawing zone.

The film was dried under releasing stress and disconnected from the tenter clips and both ends of the film was trimmed and the film was continuously heat-treated by a heat-treating device comprising four polytetrafluoroethylene coated hot rolls having a surface temperature of 205° C. for a short time and was quenched and taken up.

The resulting film had excellent mechanical properties and had a styrene-acryl copolymer coated layer which had excellent water resistance and heat resistance. A laminate film prepared by laminating polyethylene on the non-coated surface of the film was a packaging film having excellent fabricability in automatic packaging machines.

EXAMPLE 3

A solution prepared by dissolving 100 wt. parts of polyvinyl alcohol having a polymerization degree of 1100, a hydrolysis degree of 99.4 mole %, 10 wt. parts of glycerin and 2 wt. parts of diethyleneglycol in 900 wt. parts of water was spread through a slit on a stainless steel belt held between a driving roll and a sub-roll having an axial distance of 10 m for a flow casting at a speed of 8 m/min and was dried to form a film.

After peeling off the film from the stainless steel belt, the film was dried in a dryer comprising six hot rolls at a speed of 8.5 m/min. to give 20 wt.% of a water content at the peeling point and 7 wt.% of a water content after drying on the hot rolls. The dried film was fed to a coating zone of two pairs of reverse roll type coater and a latex of vinylidene chloride having a solid concentration of 45 wt.% and pH of 4 was coated on one surface of the dried film at a solid component rate of 18 g/m$^2$ by the first coater and then, dried by passing it through a drying zone having a length of 5 m to form a coated membrane and the film was reversely turned and a later of acrylate having a solid concentration of 35 wt.% and pH of 3 was coated on the non-coated surface at a solid component rate of 12 g/m$^2$ by the second coater and then, dried by passing it through a drying zone having a length of 5 m to form a coated membrane. The water content of the film was 12 wt.% at the outlet of the first coating zone and 15 wt.% at the outlet of the second coating zone.

The film obtained from the second coating device was fed into the drawing device and the heat-treating device used in Example 2 to perform the concurrent biaxial drawing, the stress-releasing and drying and the heat-treatment.

In the drawing zone, a hot air at 90° C. was fed to give 75° C. of the temperature of the film and 6.5 wt.% of a water content of the drawn film at the outlet of the drawing zone and in the stress-releasing zone, a hot air at 155° C. was fed to give 135° C. of the temperature of the film and 1.4 wt.% of water content of the drawn film at the outlet thereof. The sum of forces applied to the tenter clips at the outlet of the drawing zone i.e. the inlet of the stress-releasing zone was 5.5 Kg as maximum and it was reduced to 1.2 Kg at the outlet of the stress-releasing zone.

Both ends of the film disconnected from the tenter clips were trimmed and the film was heat-treated by a polytetrafluoroethylene coated roll having a surface temperature of 190° C. and was taken up.

The resulting film had excellent mechanical properties and had a vinylidene chloride resin coated layer which had excellent water resistance on one surface and an acrylate resin coated layer which had excellent heat resistance on the other surface. The resulting film is a valuable film used for food packaging and industrial uses in various field.

EXAMPLE 4

A flaky composition prepared by mixing 100 wt. parts of polyvinyl alcohol having a polymerization degree of 1680, a hydrolysis degree of 99.4%, 85 wt. parts of water, 8 wt.parts of polyethyleneglycol having a polymerization degree of 200 and a small amount of calcium carbonate powder, was melted in an extruder having a diameter of 65 mm and extruded through a ring die having a diameter of 200 mm at a discharge rate of 1.5 m/min. in a tubular form and a diameter of the tubular film was controlled by controlling a pressure of air fed into the tubular film and discharged out of the tubular film and controlling air, fed from an air ring to the outer surface of the tubular film and the film was dried by a ring type infrared ray heater and then, the film was nipped by nip rolls.

A diameter of the film in the drying zone was the maximum of 240 mm and a peripheral speed of the nip rolls was controlled to 1.8 m/min. to give 320 mm of a bent width of the film and 12 wt.% of a water content.

In a test of an uniaxial drawing of test pieces sampled from the film at 100° C., a ratio of a tensile stress in the longitudinal direction to that of the transverse direction was 0.92 at an elongation percent of 100%.

A latex of vinylidene chloride, vinyl chloride copolymer having a solid concentration of 48 wt.% and pH of 5 was coated on the surfaces of the dried and nipped tubular film at a solid component rate of 12 g/m$^2$ by an immersing coater and the film was dried to form a coated membrane to increase an average water content of 17 wt.%.

In a test, the coated membrane was peeled off from the film and a water content of the substrate film was measured to give 14.5 wt.%.

The coated tubular film was fed into a tubular type drawing device comprising two pairs of nip rolls, a preheating ring heater, a drawing ring heater, a cooling cylinder for controlling a diameter of the film after the drawing and guide rolls for bending. The cooling cylinder has a jacket structure having perforated wall at the side contacting with the film. When air was fed into the jacket, air was discharged through the perforated wall to form a gas cushion between the film and the cooling cylinder.

Air was fed into the tubular film and a pressure in the tubular film and a difference of speeds of the pairs of nip rolls were controlled in a concurrent-biaxial drawing step to give the transversal elongation ratio of 3 times and the longitudinal elongation ratio of 3.5 times and the size of the film at the end of the drawing step was kept by the cooling cylinder and air at 75° C. was fed through the perforated wall of the cooling cylinder to the film to perform the stress-release and drying of the drawn film. The film was plated by a bending guide rolls and nipped by the nip rolls to give 2.5 wt.% of a water content.

The nipped and dried film was heat-treated by a tenter type heat-treating device at 220° C. for a short time. Both of edges of the film were trimmed and the drawn film was divided into two sheets and taken up by winders. The resulting film had a thickness of 12μ and had excellent tensile strength.

The physical properties of the biaxially drawn polyvinyl alcohol film obtained by Examples are shown in Table 4.

TABLE 4

| Physical property | Measurement | Unit | Example 1 | 2 | 3 | 4 |
|---|---|---|---|---|---|---|
| Tensile strength | Long ASTM Tran D882-67 (20° C., 65% RH) | Kg/mm² | 33 35 | 29 26 | 28 25 | 26 27 |
| Elongation | Long ASTM Tran D882-67 (20° C., 65% RH) | % | 63 46 | 55 74 | 67 60 | 71 63 |
| Young's modulus | Long ASTM Tran D882-67 (20° C., 65% RH) | Kg/mm² | 600 580 | 560 540 | 590 570 | 550 530 |
| Oxygen permeability | Mocon method (20° C. 100% RH) | cc/m². 24 hr. atom | 0.6 | — | 1.8 | 0.9 |

What is claimed is:

1. A process for preparing a concurrently-biaxially drawn polyvinyl alcohol film, comprising the steps of:
   (a) fabricating a molten, hydrated polyvinyl alcohol into a film;
   (b) drying said film while preventing orientation of the film thereby obtaining a substrate film which is in a substantially non-oriented state and which has a water content of 3 to 20 wt. %;
   (c) coating said dried film on at least one surface with an aqueous dispersion of a macromolecular compound thereby forming a coated film wherein the film substrate has an average water content of 5 to 30 wt. % as a result of water permeation into the substrate film from said coating, the average water content of said substrate film increasing by 2 to 10 wt. % as a result of said water permeation;
   (d) concurrently-biaxially drawing said coated film to achieve an area elongation of 600 to 1300%;
   (e) heat treating said drawn film to relieve stress in said film and to dry said film to a water content of less than 3 wt.%; and
   (f) continuing the heat treating of said dried film at a temperature greater than 160° C. but less than the decomposition temperature to achieve the film product.

2. The process according to claim 1 wherein said molten polyvinyl alcohol is fabricated by a hydrate extruding method to form a flat substrate film.

3. The process according to claim 1 wherein said molten polyvinyl alcohol is fabricated by a flow-casting method to form a flat substrate film.

4. The process according to claim 1 wherein said molten polyvinyl alcohol is fabricated by a tubular shaping device to form a substrate film.

5. The process according to claim 1, wherein said substrate film having been uniaxially drawn longitudinally and transversely at 100° C. has a tensile stress ratio in the longitudinal direction to the transverse direction of 1.10 at an elongation percent of 100%.

6. The process according to claim 1 wherein said macromolecular compound in said aqueous dispersion is a homopolymer selected from the group consisting of polyethylene, polystyrene, polyvinyl, polyacryl and polyurethane; a resin selected from the group consisting of fluorinated resins, silicone resins, epoxy resins, natural resins; a copolymer selected from the group consisting of vinylidene chloride/vinyl chloride copolymers, vinylidene chloride/acryl copolymers, vinylacetate/acryl copolymers, styrene/acryl copolymers and ethylene/vinyl acetate copolymers; a terpolymer selected from the group consisting of methyl methacrylate/ethylacrylate/acrylic acid terpolymers, ethylene/vinylacetate/vinyl ester of a $C_{10}$ aliphatic acid terpolymers, and a modified resin selected from the group consisting of nitrocellulose and derivatives thereof, synthetic rubber modified resins, vinyl acetate modified resins and acryl modified resins.

7. The process according to claim 1 wherein said aqueous dispersion of the macromolecular compound has a solid concentration of 20 to 60 wt.% and a pH of 2 to 9.

8. The process of claim 1, wherein the amount of solid component from said aqueous dispersion coated on said substrate film is greater than 10 g/m².

9. The process according to claim 1, 6, 7 or 8 wherein said aqueous dispersion of the macromolecular compound is coated on both surfaces of said substrate film.

10. The process according to claim 1 wherein during concurrent-biaxial drawing the ratio of longitudinal drawing to transverse drawing from the start of drawing to the end of drawing is in the range of 0.5 to 2.0.

11. The process according to claim 1 wherein said concurrent-biaxial drawing of said coated film is conducted by a tenter device.

12. The process according to claim 1 wherein said concurrent-biaxial drawing of said coated film is conducted by a tubular device.

13. The process of claim 1, wherein in the heat treatment of said drawn film to dry the film and relieve stress in the film, the heating is conducted at a temperature of $T \leq 100x^2 + 30x + 150(°C.)$ as determined by the relationship: $x = (Fmax - F)/Fmax$ wherein Fmax is the maximum stress at the end of the drawing step, F is the stress in the stress releasing step and x is the stress release coefficient.

14. The process according to claim 13 wherein the stress-releasing and drying are gradually conducted in a dryer.

15. The process according to claim 13 wherein stress releasing and drying are conducted on the connected part of a drawing machine link driving device.

16. The process of claim 1, wherein said dried film is heat treated while said film, free of stress in the transverse direction, passes over a plurality of rollers.

17. The process of claim 1, wherein said dried film is heat treated with a tenter device which maintains the film at constant longitudinal and transverse lengths.

* * * * *